US012280525B2

(12) United States Patent
Sbriglia

(10) Patent No.: US 12,280,525 B2
(45) Date of Patent: Apr. 22, 2025

(54) POROUS ARTICLES FORMED FROM POLYPARAXYLYLENE AND PROCESSES FOR FORMING THE SAME

(71) Applicant: W. L. Gore & Associates, Inc., Newark, DE (US)

(72) Inventor: Guy A. Sbriglia, Christiana, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 845 days.

(21) Appl. No.: 14/810,999

(22) Filed: Jul. 28, 2015

(65) Prior Publication Data
US 2016/0032069 A1 Feb. 4, 2016

Related U.S. Application Data

(60) Provisional application No. 62/030,419, filed on Jul. 29, 2014.

(51) Int. Cl.
*B29C 43/52* (2006.01)
*B01D 67/00* (2006.01)
(Continued)

(52) U.S. Cl.
CPC .......... *B29C 43/52* (2013.01); *B01D 67/0027* (2013.01); *B01D 69/12* (2013.01);
(Continued)

(58) Field of Classification Search
CPC ........ B01D 71/72; B01D 69/12; B01D 71/28; B01D 67/0027; B01D 71/36; B29C 43/52;
(Continued)

(56) References Cited

U.S. PATENT DOCUMENTS 2,999,820 A * 9/1961 Young .................... C08G 61/00
528/396
3,342,754 A * 9/1967 Gorham .................. B05D 1/60
428/195.1
(Continued)

FOREIGN PATENT DOCUMENTS

AU       2015296583 A1    2/2017
AU       2017212317 A1    5/2018
(Continued)

OTHER PUBLICATIONS

PubChem Quinodimethane (National Center for Biotechnology Information. PubChem Compound Database; CID=136327, https://pubchem.ncbi.nlm.nih.gov/compound/136327, accessed Oct. 24, 2017).*
(Continued)

*Primary Examiner* — James C Yager
*Assistant Examiner* — Thomas J Kessler

(57) ABSTRACT

Polyparaxylylene (PPX) polymers that can be expanded into porous articles that have a node and fibril microstructure are provided. The fibrils contain PPX polymer chains oriented with the fibril axis. The PPX polymer may contain one or more comonomer. PPX polymer articles may be formed by applying PPX to a substrate by vapor deposition. The nominal thickness of the PPX polymer film is less than about 50 microns. The PPX polymer film may be removed from the substrate to form a free-standing PPX polymer film, which may then be stretched into a porous article. Alternatively, a PPX polymer article can be formed by lubricating PPX polymer powder, heating the lubricated powder, and calendering or ram extruding to produce a preform that can subsequently be stretched into a porous article. The heating and expansion temperatures are from about 80° C. to about 220° C. or from about 220° C. to about 290° C. or from about 290° C. to about 450° C.

6 Claims, 16 Drawing Sheets

(51) Int. Cl.
  *B01D 69/12* (2006.01)
  *B01D 71/36* (2006.01)
  *B29C 39/38* (2006.01)
  *B29C 43/24* (2006.01)
  *B29C 55/12* (2006.01)
  *B29C 55/20* (2006.01)
  *B29D 7/01* (2006.01)
  *B29K 105/04* (2006.01)
  *C08J 5/18* (2006.01)
  *C09D 165/04* (2006.01)

(52) U.S. Cl.
  CPC .............. *B29C 39/38* (2013.01); *B29C 55/12* (2013.01); *B29C 55/20* (2013.01); *B29D 7/01* (2013.01); *C08J 5/18* (2013.01); *C09D 165/04* (2013.01); B01D 71/36 (2013.01); B29C 43/24 (2013.01); B29K 2065/00 (2013.01); B29K 2105/04 (2013.01); B29K 2995/0006 (2013.01); B29K 2995/0018 (2013.01); B29K 2995/0056 (2013.01); B29K 2995/0058 (2013.01); C08G 2261/3424 (2013.01); C08J 2327/18 (2013.01); C08J 2365/04 (2013.01)

(58) Field of Classification Search
  CPC ......... B29C 55/02; B29C 55/20; B29C 55/12; B29C 43/006; B29C 39/38; B29C 43/24; C08J 5/2256; C08J 7/047; C08J 5/18; C08J 2465/04; C08J 2327/18; C08J 2365/04; C08J 9/26; C08J 9/228; C09D 165/04; B29D 7/01; C08G 2261/3424; B29K 2995/0056; B29K 2995/0018; B29K 2995/0058; B29K 2105/04; B29K 2065/00; B29K 2995/0006; C08L 65/04
  USPC ......... 428/304.4, 305.5, 319.3, 318.4, 315.5, 428/316.6, 35.2, 206, 315.9, 319.7, 336, 428/411.1, 422, 131, 137, 156, 158, 159, 428/172, 195.1, 196, 306.6, 309.9, 315.7, 428/338, 343, 355 EN, 421, 76
  See application file for complete search history.

(56) References Cited

U.S. PATENT DOCUMENTS

| | | | |
|---|---|---|---|
| 3,666,517 A * | 5/1972 | Isaacson | B29C 55/026 264/134 |
| 3,953,566 A | 4/1976 | Gore | |
| 3,962,153 A | 6/1976 | Gore | |
| 4,187,390 A | 2/1980 | Gore | |
| 5,209,987 A * | 5/1993 | Penneck | C23C 14/027 428/457 |
| 5,438,443 A | 8/1995 | Kaisha | |
| 6,068,952 A | 5/2000 | Narimatsu et al. | |
| 6,086,952 A * | 7/2000 | Lang | B05D 1/60 427/255.29 |
| 6,123,993 A | 9/2000 | Xu et al. | |
| 6,521,012 B2 | 2/2003 | Lamon et al. | |
| 6,946,405 B2 | 9/2005 | Takahashi et al. | |
| 7,462,750 B2 * | 12/2008 | Hanefeld | C07C 17/269 570/127 |
| 7,566,407 B2 | 7/2009 | Teleshov et al. | |
| 8,142,836 B2 | 3/2012 | Chappa | |
| 2002/0174767 A1 | 11/2002 | Notzon | |
| 2006/0238639 A1 | 10/2006 | Gabel et al. | |
| 2011/0236745 A1 * | 9/2011 | Brant | B01D 71/44 429/145 |
| 2013/0130120 A1 | 5/2013 | Park et al. | |
| 2013/0177699 A1 | 7/2013 | Stevens et al. | |
| 2016/0136914 A1 | 5/2016 | Sbriglia | |

FOREIGN PATENT DOCUMENTS

| | | | | |
|---|---|---|---|---|
| CA | 2956701 | A1 | 2/2016 | |
| CA | 3005270 | A1 | 8/2017 | |
| CN | 106795303 | A | 5/2017 | |
| CN | 108699263 | A | 10/2018 | |
| CN | 112239556 | A | 1/2021 | |
| CN | 112831073 | A | 5/2021 | |
| EP | 0349032 | | 6/1988 | |
| EP | 0349032 | A2 * | 1/1990 | .......... C08G 61/025 |
| EP | 1237362 | B1 | 2/2004 | |
| EP | 1260781 | B1 | 3/2005 | |
| EP | 1260712 | B1 | 4/2009 | |
| EP | 3174945 | B1 | 7/2018 | |
| EP | 3385346 | A1 | 10/2018 | |
| EP | 3388492 | A1 | 10/2018 | |
| EP | 3408316 | A1 | 12/2018 | |
| JP | 2006289627 | | 10/2006 | |
| JP | 2010030295 | | 2/2010 | |
| JP | 4437587 | B2 * | 3/2010 | |
| JP | 2018-538403 | A | 12/2018 | |
| KR | 10-2134982 | B1 | 7/2020 | |
| KR | 10-2331830 | B1 | 11/2021 | |
| WO | WO9318214 | | 9/1993 | |
| WO | WO03045666 | | 6/2003 | |
| WO | WO2010062856 | | 6/2010 | |
| WO | 2016/018967 | A1 | 2/2016 | |
| WO | 2017/132077 | A1 | 8/2017 | |

OTHER PUBLICATIONS

And PubChem 6011-52-6 (National Center for Biotechnology Information. PubChem Compound Database; CID=6453910, https://pubchem.ncbi.nlm.nih.gov/compound/6453910, accessed Oct. 24, 2017).*
English machine translation of JP-4437587-B2 obtained from PE2E (Year: 2010).*
Poly(p-xylene), 2022, Polymerdatabase (Year: 2022).*
International Search Report PCT/US2017/014490 dated May 11, 2017.
Van Der Werff, H., et al., High strength and high modulus fibers of poly(p-xylylene), Polymer Bulletin 19, 587-594, 1988.
Van Der Werff, H., et al., Creep resistance and high temperature strength of poly(p-xylylene) fibers, Polymer Bulletin 25,379-384, 1991.
International Preliminary Report on Patentability received for PCT Patent Application No. PCT/US2015/042563, mailed on Feb. 9, 2017, 9 pages.
International Search Report and Written Opinion received for PCT Patent Application No. PCT/US15/042563, mailed on Oct. 5, 2015, 11 pages.

* cited by examiner

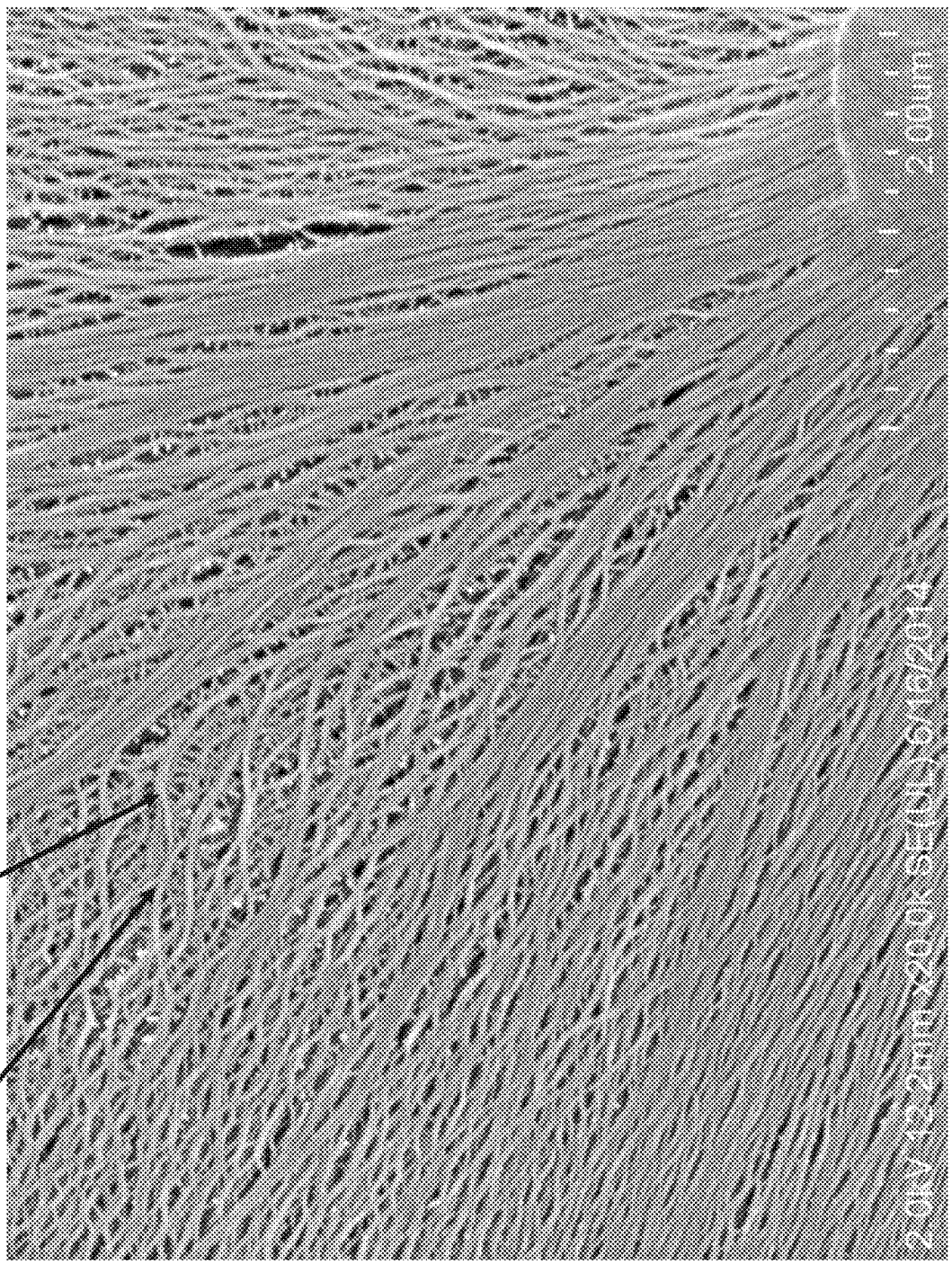

POROUS ARTICLES FORMED FROM POLYPARAXYLYLENE AND PROCESSES FOR FORMING THE SAME

FIELD

The present invention relates generally to polyparaxylylene, and more specifically to porous articles containing polyparaxylylene polymers where the articles have a node and fibril structure. A process for the formation of porous articles from polyparaxylylene polymers is also provided.

BACKGROUND

Polyparaxylylene (PPX) and its derivatives are well known in the art. Articles made from PPX possess physical properties such as resistance to chemical attack, resistance to gamma radiation, thermo-oxidative stability at elevated temperatures, biocompatibility, high dielectric strength, high mechanical strength, and excellent barrier properties. Because of the favorable attributes associated with it, PPX has been utilized as a monolithic coating or film in a variety of applications including thin film dielectrics, electrical insulation, chemical resistance, and barrier coatings.

Unfortunately, PPX polymers cannot be made into useful forms by conventional processing routes such as compression molding, extrusion, solvent casting, gel spinning, or sintering because there is no melt state or solution state. However, porous PPX articles have been made through the addition of porogens, by coating a porous scaffold composed of another polymer, and by thermal exposure that causes degradation of the PPX polymer introducing localized holes. These approaches to creating porous microstructures limit the possible microstructures and/or degrade the physical properties of the porous PPX material.

Thus, there exists a need in the art for a process for making a PPX article and a PPX article that is porous and maintains the excellent physical properties of PPX.

SUMMARY

One embodiment relates to a porous polyparaxylylene (PPX) article having nodes and fibrils. Polymer chains in the fibrils are oriented along a fibril axis. In at least one embodiment, the polymer includes small amounts of one or mare comonomer. The comonomer may be present in an amount from about 0.001 mol % to about 10 mol % of the PPX polymer. The PPX article has a thickness less than about 50 microns and a percent porosity of at least about 10%. In one or more embodiment, the PPX article is a sheet, tape, or tube.

A second embodiment relates to a process for forming a porous polyparaxylylene article that includes (1) depositing a polyparaxylylene (PPX) film on a substrate, (2) removing the PPX film from the substrate, and (3) expanding the PPX film to form a porous PPX article having a node and fibril structure. In at least one embodiment, the PPX film is vapor deposited onto the substrate, which in exemplary embodiments may be a polytetrafluoroethylene tape or membrane or an expanded polytetrafluoroethylene tape or membrane. The polymer chains in the fibrils are oriented along a fibril axis. The PPX film deposited onto the substrate has a nominal thickness less than about 50 microns. Also, the PPX polymer film has a porosity of at least about 10%. The PPX polymer film may be expanded at a temperature from about 80° C. to about 220° C. or from about 220° C. to about 290° C. or from about 290° C. to about 450° C. In one or more embodiment, expansion may occur from about 80° C. to about 450° C., or from 220° C. to about 450° C.

A third embodiment relates to a process for forming a porous polyparaxylylene article that includes (1) depositing a polyparaxylylene (PPX) film on a substrate to form a PPX composite structure and (2) expanding the PPX composite structure to form a porous PPX article having a node and fibril structure. The PPX film has a thickness less than about 50 microns. The PPX composite structure may be expanded at a temperature from about 80° C. to about 220° C. or from about 220° C. to about 290° C. or from about 290° C. to about 450° C. In one or more embodiment, expansion may occur from about 80° C. to about 450° C., or from 220° C. to about 450° C. Polymer chains in the fibrils are oriented along a fibril axis. In at least one embodiment, the PPX is deposited onto the substrate by vapor deposition. The substrate is a substrate capable of substantial deformation.

A fourth embodiment relates to a process for manufacturing porous polyparaxylylene articles. The method includes (1) subjecting a lubricated polyparaxylylene (PPX) polymer to pressure and heat to form a preform article and (2) expanding the preform article to form a PPX porous article. The PPX porous article has a microstructure of nodes and fibrils. In embodiments where the PPX polymer is PPX-AF4, heating and expansion occurs at a temperature from about 80° C. to about 220° C. or from about 220° C. to about 290° C. or from about 290° C. to about 450° C. In one or more embodiment, heating and expansion may occur from about 80° C. to about 450° C., or from 220° C. to about 450° C. In embodiments where the PPX polymer is PPX-N, heating and expansion occurs at temperatures from about 220° C. to the temperature at which the PPX polymer would decompose during processing. In at least one embodiment where the PPX polymer is PPX-N, the heating and expansion occurs from about 220° C. to about 350° C. The PPX porous article has a microstructure of nodes and fibrils.

A fifth embodiment relates to a process for making a polyparaxylylene (PPX) article that includes (1) lubricating a polyparaxylylene (PPX) polymer powder to form a lubricated PPX polymer, (2) subjecting the lubricated PPX polymer to pressure at a temperature from about 220° C. to about 450° C. to form a preform article, and (3) expanding the preform article to a temperature from about 220° C. to about 450° C. to form a porous PPX article having a microstructure of nodes interconnected by fibrils. In one embodiment, the temperature in either the subjecting step or the expanding step, or both, is from about 80° C. to about 220° C. or from about 220° C. to about 290° C. or from about 290° C. to about 450° C.

A sixth embodiment relates to an article that includes expanded porous polyparaxylylene (PPX) having, in the cooling cycle of a heating-cooling cycle Differential Scanning calorimetry (DSC) observation, a first exotherm upon cooling between about 375° C. and about 400° C. and a second exotherm upon cooling between about 390° C. and about 405° C. In some embodiments, the first and second exotherms upon cooling are both between about 375° C. and about 405° C.

A seventh embodiment relates to a porous polyparaxylylene (PPX) polymer article that includes (1) a substrate and (2) an expanded PPX film on the substrate. The PPX polymer article having a node and fibril structure. In at least one embodiment, the PPX film has a thickness less than about 50 microns. The fibrils include polymer chains oriented along a fibril axis. In addition, the substrate may be an expanded polytetrafluoroethylene (ePTFE) membrane, a polytetrafluoroethylene (PTFE) tape, a PTFE membrane, an expanded polytetrafluorethylene (ePTFE) tape, polyimide, polyamide-imide, silicon, glass, or zinc.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 7A is a scanning electron micrograph (SEM) of the surface of the expanded porous polyparaxylylene-AF4 article of Example 3 taken at 20,000× magnification in accordance with an embodiment of the invention;

GLOSSARY

Figure 1:
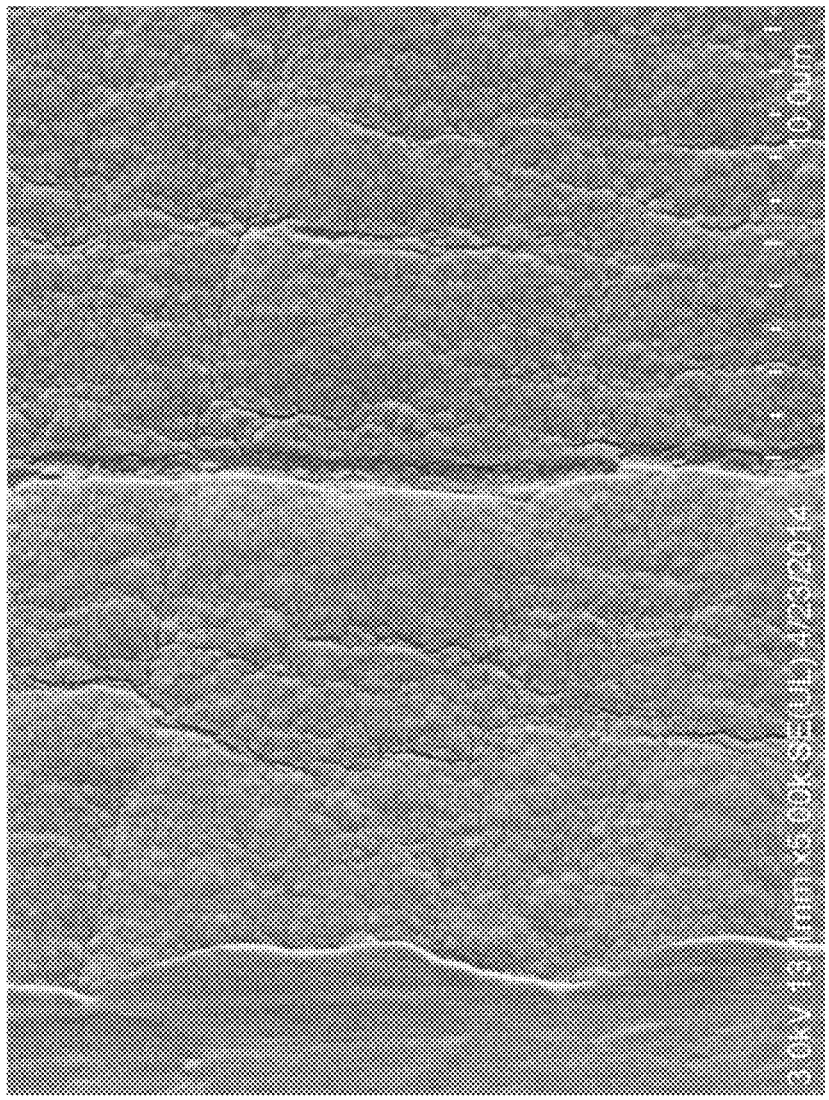
FIG. 1 is a scanning electron micrograph (SEM) of the surface of the non-expanded, non-porous polyparaxylylene-AF4 film of the Comparative Example taken at 5,000× magnification.

As used herein, the term "PPX" refers to polyparaxylylene.

As used herein, the term "PPX polymer" is meant to include all forms of PPX, including PPX-N, PPX-AF4, PPX-VT4, and combinations thereof.

The term "PPX polymer film" as used herein is meant to denote unexpanded PPX polymer, either freestanding or on a substrate.

The term "PPX polymer membrane" as used herein is meant to denote a PPX polymer film that has been expanded in one or more directions.

The term "PPX composite structure" as used herein is meant to describe a PPX polymer film that has been formed on a substrate.

As used herein, a porous PPX polymer article is meant to denote an expanded PPX polymer membrane, either freestanding or as a co-expanded substrate/PPX membrane.

As used herein, the term "lubricant" is meant to describe a processing aid that includes, and in some embodiments, consists of, an incompressible fluid that is not a solvent for the polymer at processing conditions. The fluid-polymer surface interactions are such that it is possible to create a homogenous mixture.

As used herein, the term "extension ratio" is meant to define strain as the final length divided by the original length.

As used herein, the term "node" is meant to describe the connection point of at least two fibrils.

As used herein, the term "thin" is meant to describe a thickness of less than about 50 microns.

As used herein, the term "fibril axis" is meant to describe direction parallel to the long dimension of the fibril.

As used herein, the term "substantial deformation" is meant to describe a substrate that is capable of elongating in one or more direction without breaking.

DETAILED DESCRIPTION

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

The present invention relates to polyparaxylylene (PPX) polymers that can be expanded into porous articles that have a node and fibril microstructure. In at least one embodiment, the fibrils contain PPX polymer chains oriented with the fibril axis. Optionally, the PPX polymer may contain one or more comonomer. As used herein, the term "PPX polymer" is meant to include all forms of PPX, including PPX-N, PPX-AF4, PPX-VT4, and combinations thereof.

In forming a porous PPX polymer article, PPX may be applied to a substrate, such as by any conventional vapor deposition method. The substrate is not particularly limiting so long as the substrate is dimensionally stable and the PPX polymer film formed thereon can be removed therefrom if desired. Non-limiting examples of suitable substrates include a polytetrafluoroethylene (PTFE) tape or membrane, an expanded polytetrafluoroethylene (ePTFE) tape or membrane, polyimide, polyamide-imide, silicon, glass, zinc, or any substrate that can withstand expansion temperatures above about 220° C. In exemplary embodiments, the substrate is capable of substantial deformation, such as a PTFE film or membrane.

The PPX polymer film formed on the substrate may have a nominal thickness less than about 50 microns. In exemplary embodiments, the PPX polymer film has a thickness from about 0.1 microns to about 50 microns, from about 0.1 microns to about 40 microns, from about 0.01 microns to about 30 microns, from about 0.1 microns to about 20 microns, from about 0.1 microns to about 10 microns, from about 0.01 microns to about 5 microns, from about 0.1 microns to about 2 microns, or from about 0.1 microns to about 1 micron. The ability to apply a thin PPX polymer film on a PTFE substrate, for example, enables the formation of a composite structure containing two different polymer layers with two different microstructures. The difference between the first microstructure and the second microstructure can be measured by, for example, a difference in pore size (porosity), a difference in node and/or fibril geometry or size, and/or a difference in density.

The PPX polymer film may be removed from the substrate to form a free-standing PPX polymer film. This free-standing PPX polymer film may be stretched or expanded in one or more directions to form a porous PPX membrane. Alternatively, a PPX composite structure (e.g., the PPX polymer film on a substrate) may be co-expanded in one or more directions to form a porous article (e.g., co-expanded PTFE/PPX membrane). It is to be appreciated that even though the substrate and the PPX polymer film are expanded together, the expanded PPX polymer film may be removed from the expanded substrate to form a free standing expanded PPX polymer membrane. This expanded PPX polymer membrane is a porous PPX polymer article. It is to be noted that the expanded composite structure (e.g., the expanded PPX polymer film and expanded substrate) may remain as a single unit in some embodiments.

In an alternate embodiment, the PPX may be deposited onto a partially expanded substrate, such as a partially expanded PTFE tape or membrane. The PPX polymer film and the partially expanded substrate may then be co-expanded. The expanded PPX polymer film may be removed from the expanded substrate to become a free-standing PPX expanded polymer membrane or porous PPX article.

The PPX polymer film (with or without an expandable substrate) may be cut into suitable sizes for expansion. Expansion of the free-standing PPX polymer films occur at a temperature from about 80° C. to about 220° C. or from about 220° C. to about 290° C. or from about 290° C. to about 450° C. Expansion of a composite structure of a PPX polymer film/PTFE substrate may occur at temperatures from about 80° C. to about 220° C., from about 220° C. to about 340° C., or from about 290° C. to about 340° C. (i.e., below the melt temperature of the PTFE substrate). It is to be noted that the maximum temperature for expanding any composite structure is the temperature at which the substrate degrades or melts. Expansion may be conducted at engineering strain rates (ESR) up to 10,000%/second, or from 1% to 10,000%/second or from 10% to 5000%/second to form an expanded, porous PPX article.

Figure 3:
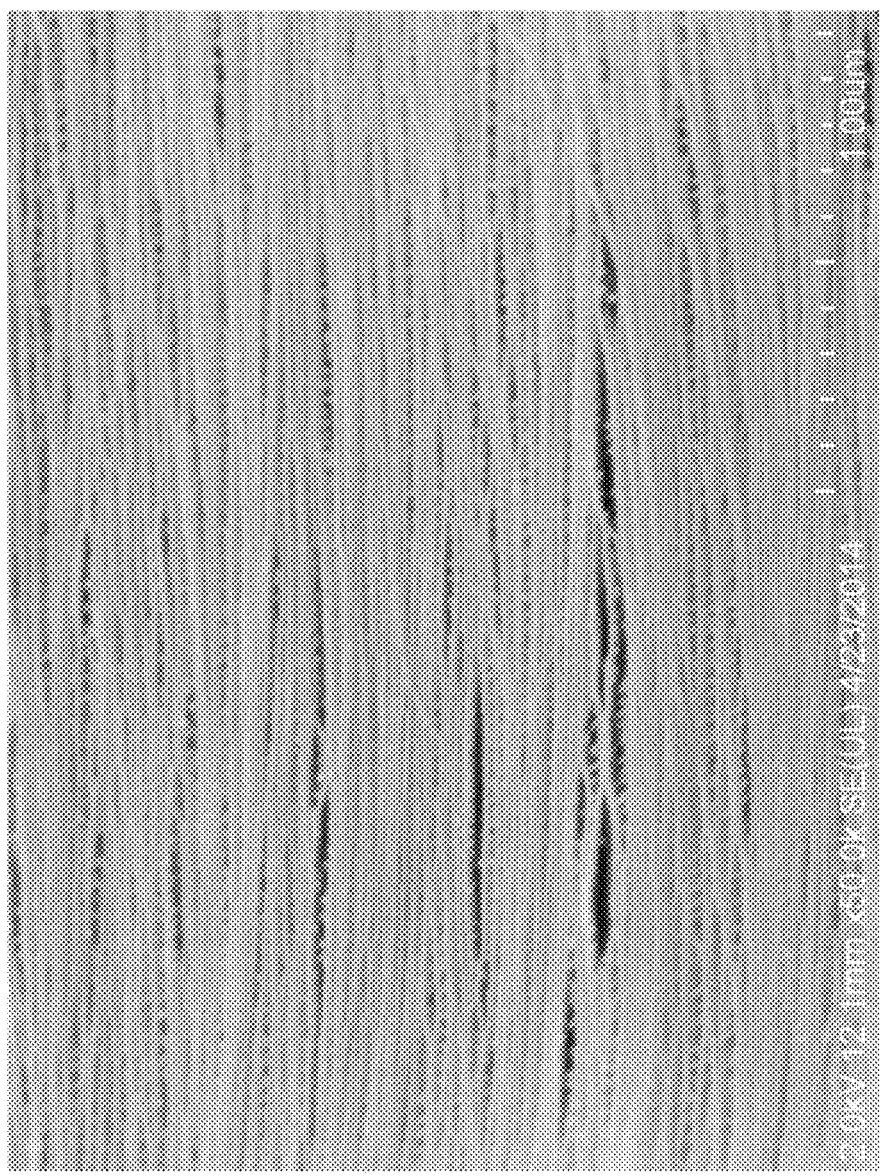
FIG. 3 is a scanning electron micrograph (SEM) of the surface of the expanded porous polyparaxylylene-AF4 membrane of Example 1 taken at 50,000× magnification where the machine direction (MD) is horizontal in accordance with one embodiment of the invention.
Figure 4:
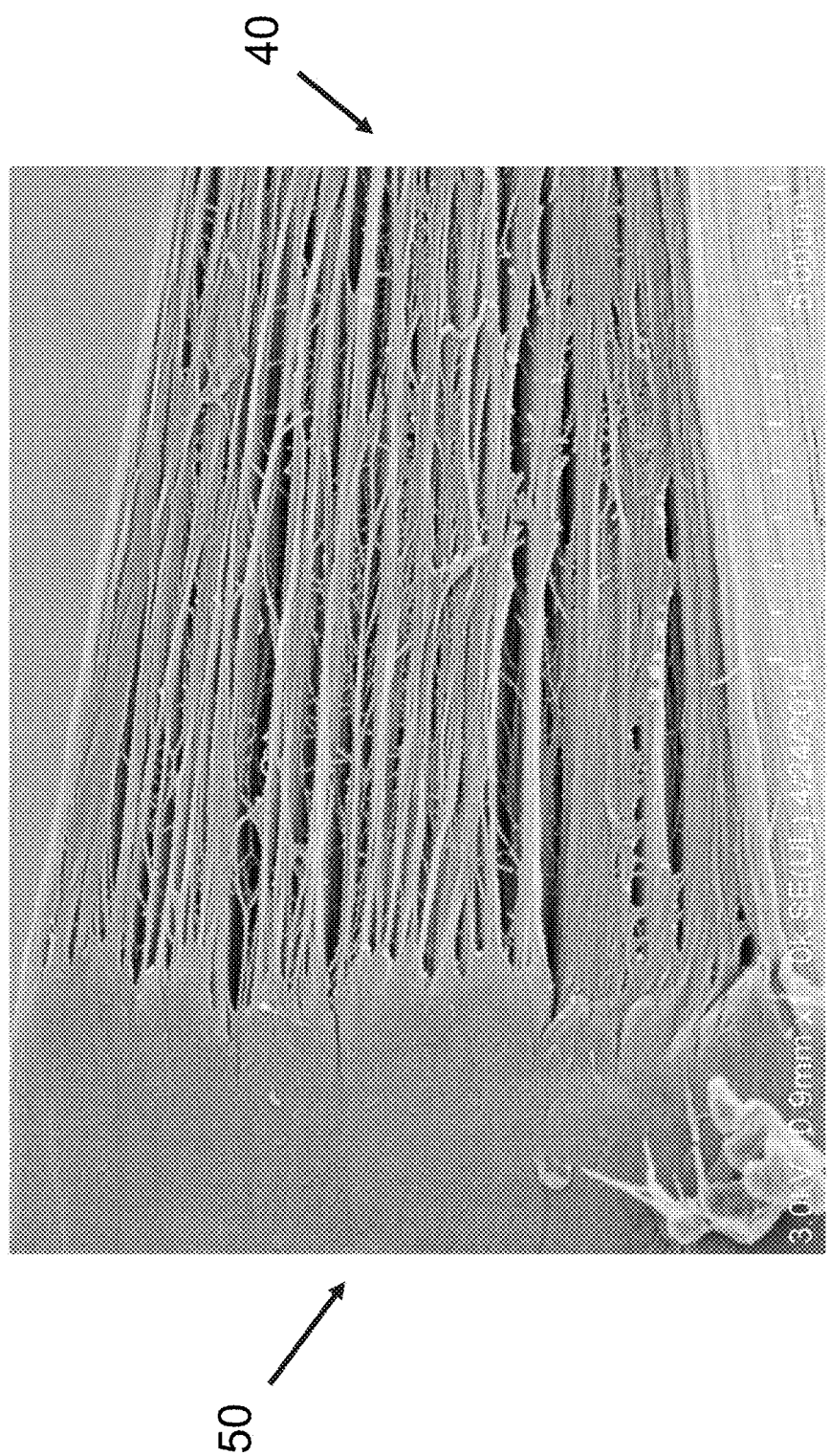
FIG. 4 is a scanning electron micrograph (SEM) of the cross-section of the expanded porous polyparaxylylene-AF4 sheet of Example 1 taken at 11,000× magnification in accordance with one embodiment of the invention.

The expanded PPX membrane has a microstructure of nodes interconnected by fibrils, optionally with regions of unexpended PPX, such as may be seen in FIGS. 3, 4, 7, 8, 9 and 10. FIGS. 4 and 7B, for example, show expanded regions 40 and unexpanded regions 50 in the expanded PPX membranes. The microporous structure and the geometry of the interconnected fibrils can be controlled by the deposition conditions, the rate of expansion, temperature of expansion, and ultimate expansion ratio in each direction.

Figure 5:
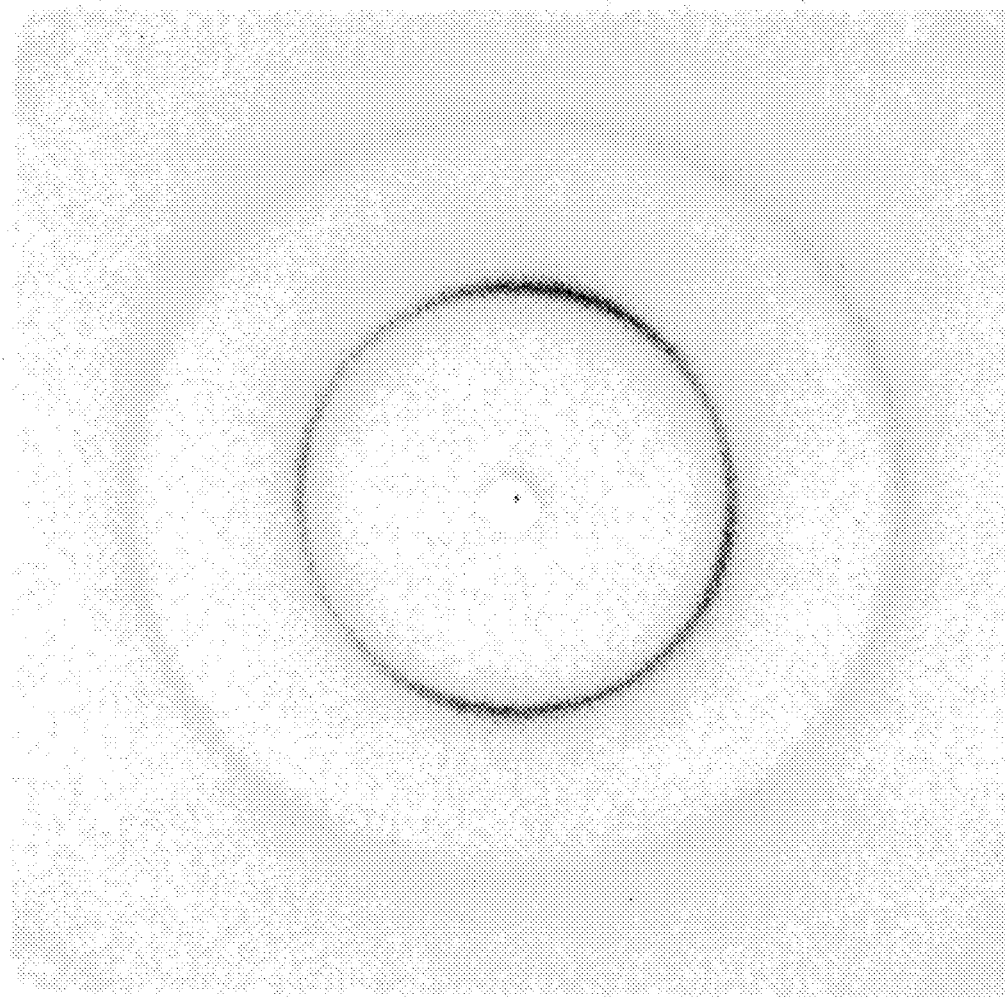
FIG. 5 is a wide angle x-ray diffraction (WAXD) pattern of the non-expanded, non-porous polyparaxylylene-AF4 film of the Comparative Example.
Figure 6:
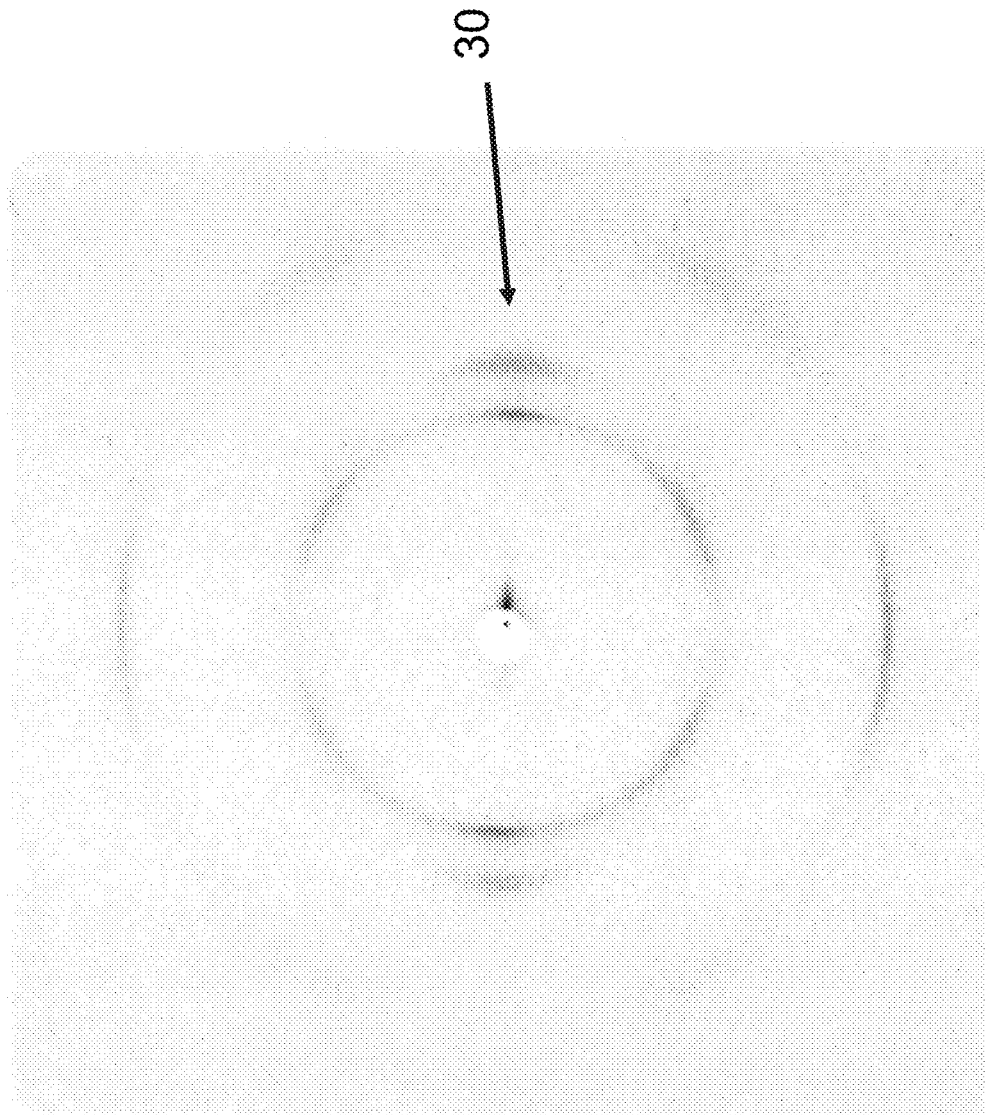
FIG. 6 is wide angle x-ray diffraction (WAXD) pattern of the biaxially expanded porous polyparaxylylene-AF4 membrane of Example 1 with the machine direction oriented in the vertical direction according to at least one embodiment of the invention.

Looking at FIG. 5, a wide angle x-ray diffraction (WAXD) pattern consistent with highly crystalline, randomly oriented lamella of the unexpanded or as-deposited PPX sample is depicted. In contrast, the WAXD pattern of an expanded PPX article oriented with the larger expansion in the vertical direction is depicted in FIG. 6, which depicts a new diffraction peak at reference numeral 30. This WAXD pattern shows an emergence of two additional equatorial reflections (at 3 o'clock and 9 o'clock) in a d-spacing of about 0.45 nm and two distinct meridonal reflections (at 12 o'clock and 6 o'clock) in a d-spacing of about 0.32 nm. These reflections are associated with oriented polymer chains in the fibrils in the expanded PPX article. In other words, the polymer chains in the fibrils are oriented along the fibril axis. As would be understood by one of skill in the art, with a more balanced biaxial expansion, the expanded PPX article would display a WAXD pattern illustrating an additional signal at the 0.45 nm d-spacing, which may show up as additional diffraction spots or a concentric ring.

Additionally, the expanded PPX articles are porous, and may have a percent porosity of at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, or up to (and including) 90%. In exemplary embodiments, the expanded PPX articles may have a percent porosity from about 5% to about 75%, from about 10% to about 50%, or from about 10% to about 25%.

In an alternate embodiment, a porous PPX article may be formed from a crystalline PPX polymer in the form of a powder. In at least one embodiment, PPX polymer and a lubricant are mixed so as to uniformly or substantially uniformly distribute the lubricant in the mixture. It is to be appreciated that the term "lubricant", as used herein, is meant to describe a processing aid consisting of an incompressible fluid that is not a solvent for the polymer at the process conditions. The fluid-polymer surface interactions are such that it is possible to create a homogenous mixture. It is also to be noted that that choice of lubricant is not particularly limiting and the selection of lubricant is largely a matter of safety and convenience. Non-limiting examples of lubricants for use herein include light mineral oil, aliphatic hydrocarbons, aromatic hydrocarbons, halogenated hydrocarbons, and the like, and may be selected according to flammability, evaporation rate, and economic considerations.

It is to be appreciated that various times and mixing methods may be used to distribute the PPX polymer in the mixture. For example, for PPX-AF4, the lubricated PPX polymer is heated to a temperature about 80° C. to about 220° C. or from about 220° C. to about 290° C. or from about 290° C. to about 450° C. For those PPX variants that are subject to thermal decomposition and oxidation, such as PPX-N and PPX-VT4, the lubricated PPX polymer is heated to at a temperature from about 220° C. and below the temperature at which the polymer would decompose during processing, and in exemplary embodiments, from about 220° C. to about 250° C. (in an inert atmosphere). Along with the heating of the PPX polymer, sufficient pressure and shear is applied so as to form inter-particle connections and create a solid form. Non-limiting examples of methods of applying pressure and shear include ram extrusion (e.g., typically called paste extrusion or paste processing when lubricant is present) and calendering.

In one exemplary embodiment, the lubricated PPX polymer is calendered or ram extruded to produce a cohesive sheet that may be used as a preform. As used herein, the term "cohesive" is meant to describe a sheet that is sufficiently strong for further processing. For PPX-AF4, the calendering or ram extrusion occurs at a temperature about 80° C. to about 220° C. or from about 220° C. to about 290° C. or from about 290° C. to about 450° C. For PPX-N and PPX-VT4, the calendering or ram extrusion occurs from about 220° C. and below the temperature at which the polymer would decompose during processing, and in exemplary embodiments, from about 220° C. to about 250° C. (in an inert atmosphere). In at least one other embodiment, the lubricated PPX polymer may be ram extruded to produce a cohesive sheet, tube or cylinder preform. In either calendering or ram extruding, the PPX polymer preform may be subsequently expanded as described above to form a porous PPX polymer article.

TEST METHODS

It should be understood that although certain methods and equipment are described below, other methods or equipment determined suitable by one of ordinary skill in the art may be alternatively utilized. It is to be understood that the following examples were conducted on a lab scale but could be readily adapted to a continuous or semi-continuous process.

SEM Sample Preparation Method

SEM images were collected using an Hitachi SU8000 FE Ultra High Resolution Scanning Electron Microscope with Dual SE detectors. Cross-sectioned samples were prepared using a Cooled straight-razor blade method. Surface and cross-sectioned samples were mounted onto a 25 mm diameter metal stub with a 25 mm carbon double sided adhesive. The mounted samples were sputter coated with platinum.

Wide Angle X-Ray Diffraction (WAXD)

Diffraction patterns from as-deposited and expanded films were collected using a Molecular Metrology instrument configured for 2-D WAXD observations. The X-Ray source was a Rigaku MicroMax Sealed Micro Source CuKα element with a wavelength of 0.1542 nm running at 45 kV/66 mA. To collect two-dimensional diffraction information at wide angles a 20 cm×20 cm Fujifilm BAS SR2040 imaging plate was placed in the instrument vacuum chamber perpendicular to the X-Ray beam line at a camera length of 146 mm. Camera length was calibrated by collecting a WAXD pattern from a tricosane standard and calculating the camera length from the 110 reflection at q of 15.197 nm$^{-1}$ or d=0.4134 nm. Films approximately 10 μm thick were placed on a motorized stage and aligned perpendicular to the beam line. The vacuum chamber was then sealed and evacuated to 500 mTorr below atmospheric pressure and the beam shutter opened. Diffraction patterns were collected at ambient temperature for a period of 1-6 hours depending on the thickness and scattering intensity of the film sample. The diffraction data was collected from the Fujifilm BAS SR2040 image plates using a General Electric Typhoon FLA7000 image plate reader. Diffraction pattern images were saved as grayscale TIFF files and subsequently analyzed using POLAR analysis software.

Powder X-Ray Diffraction

Diffraction patterns from calendered PPX powder were collected using a Bruker Discovery D-8 instrument. The X-Ray source was CuKα element with a wavelength of 0.1542 nm running at 40 kV/60 mA. The instrument was configured in a Brentano-Bragg geometry. Diffraction intensity was measured using a 0D scintillation counter rotating at 0.02 degree 2-theta increments for a one second duration. The range of 2-theta was 10 degrees to 45 degrees. The instrument was calibrated using a polycrystalline silicon and an automated internal calibration algorithm. A PPX polymer was placed on the Bruker Discovery D-8 stage and aligned with the beam line.

Gurley Flow

The Gurley air flow test measures the time in seconds for 100 cm$^3$ of air to flow through a 6.45 cm$^2$ aperture at 12.4 cm of water pressure. If the sample size was smaller than 6.45 cm$^2$ an aperture of 0.645 cm$^2$ was used and the time observed divided by a factor of 10 to normalize observations made with both apertures. The samples were measured in a Gurley Densometer Model 4110 Automatic Densometer equipped with a Gurley Model 4320 automated digital timer. The reported results are the average of multiple (3-5) measurements.

DSC Measurements

DSC data were collected using a TA Instruments Q2000 DSC between 0° C. and 425° C. using a heating and a cooling rate of 10° C./min. The expanded porous membrane samples and the solid film samples were prepared by punching out 4 mm disks. The 4 mm disk was placed flat in the pan and the lid was crimped to sandwich the disk between the pan and lid.

EXAMPLES

Comparative Example

A film of PPX-AF4 having a nominal thickness of 10 μm was deposited onto a blended, extruded, and dried PTFE tape made generally in accordance with the teachings of U.S. Pat. No. 3,953,566 to Gore by a commercially available vapor deposition process (Specialty Coating Systems, 7645 Woodland Drive, Indianapolis, IN 46278).

The coated article was then cut to dimensions of 200 mm×200 mm and placed in the grips of a pantograph type biaxial batch expander equipped with a convection oven. The coated tape was heat soaked at a constant temperature of 350° C. for 300 seconds. The heat treated article was allowed to cool to room temperature under restraint of the pantograph biaxial expander grips. After cooling, the article was removed from the expander grips, the PPX-AF4 film was removed from the melted PTFE carrier tape to yield a freestanding, non-expanded, non-porous film of PPX-AF4.

Figure 2:
FIG. 2 is a scanning electron micrograph (SEM) of the cross-section of the non-expanded, non-porous polyparaxylylene-AF4 film of the Comparative Example taken at 5,000× magnification.
Figure 12:
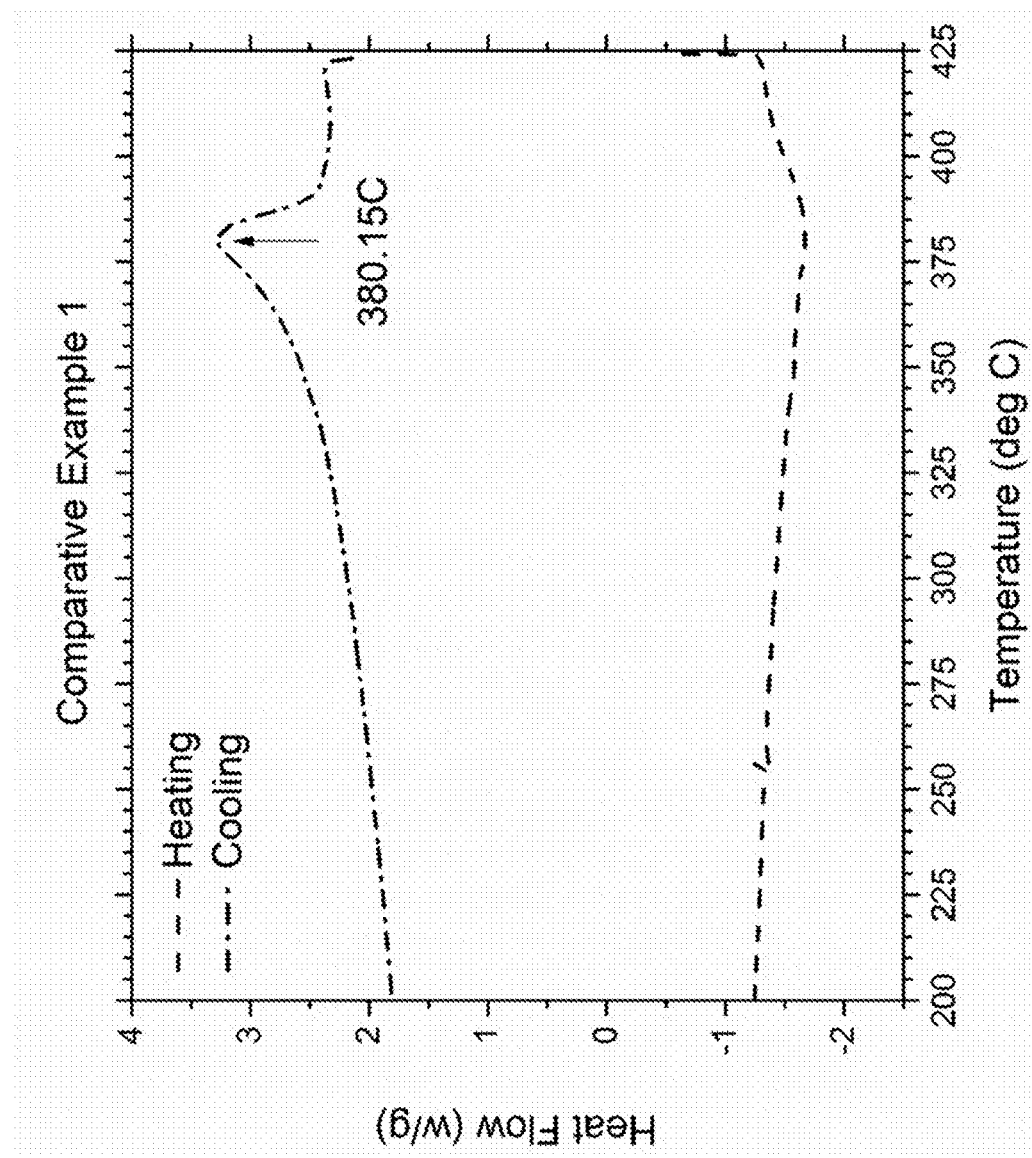
FIG. 12 is a differential scanning thermogram (DSC) of the non-expanded, non-porous PPX-AF4 membrane of the Comparative Example.

A scanning electron micrograph (SEM) of the surface and cross-section of the non-expanded, non-porous PPX-AF4 film are shown in FIGS. 1 and 2, respectively. A wide angle x-ray diffraction (WAXD) pattern of the PPX-AF4 film is shown in FIG. 5. A differential scanning thermogram (DSC) of the PPX-AF4 film is shown in FIG. 12. As shown in FIG. 12, the non-expanded, non-porous PPX-AF4 film, on cooling, exhibits a single exothermic peak at approximately 380°

C. A Gurley number of the non-expanded, non-porous PPX AF4 film was determined to be greater than 3600 seconds and is reported in Table 1.

Example 1

A film of PPX-AF4 having a nominal thickness of 10 μm was deposited onto a blended, extruded, and dried PTFE tape made generally in accordance with the teachings of U.S. Pat. No. 3,953,566 to Gore by a commercially available vapor deposition process (Specialty Coating Systems, 7645 Woodland Drive, Indianapolis, IN 46278).

The coated article was then cut to dimensions of 200 mm×200 mm and placed in the grips of a pantograph type biaxial batch expander equipped with a convection oven. The coated tape was heat soaked at a constant temperature of 350° C. for 300 seconds. The coated tape was then simultaneously stretched at an engineering strain rate (ESR) of 100 percent/second to an extension ratio in the tape machine direction of 1:1 and 4:1 in the tape transverse direction. The expanded article was allowed to cool to room temperature under restraint of the pantograph biaxial expander grips. After cooling, the article was removed from the expander grips and a film of porous PPX-AF4 was removed from the melted PTFE tape to yield a freestanding porous membrane of PPX-AF4.

Figure 13:
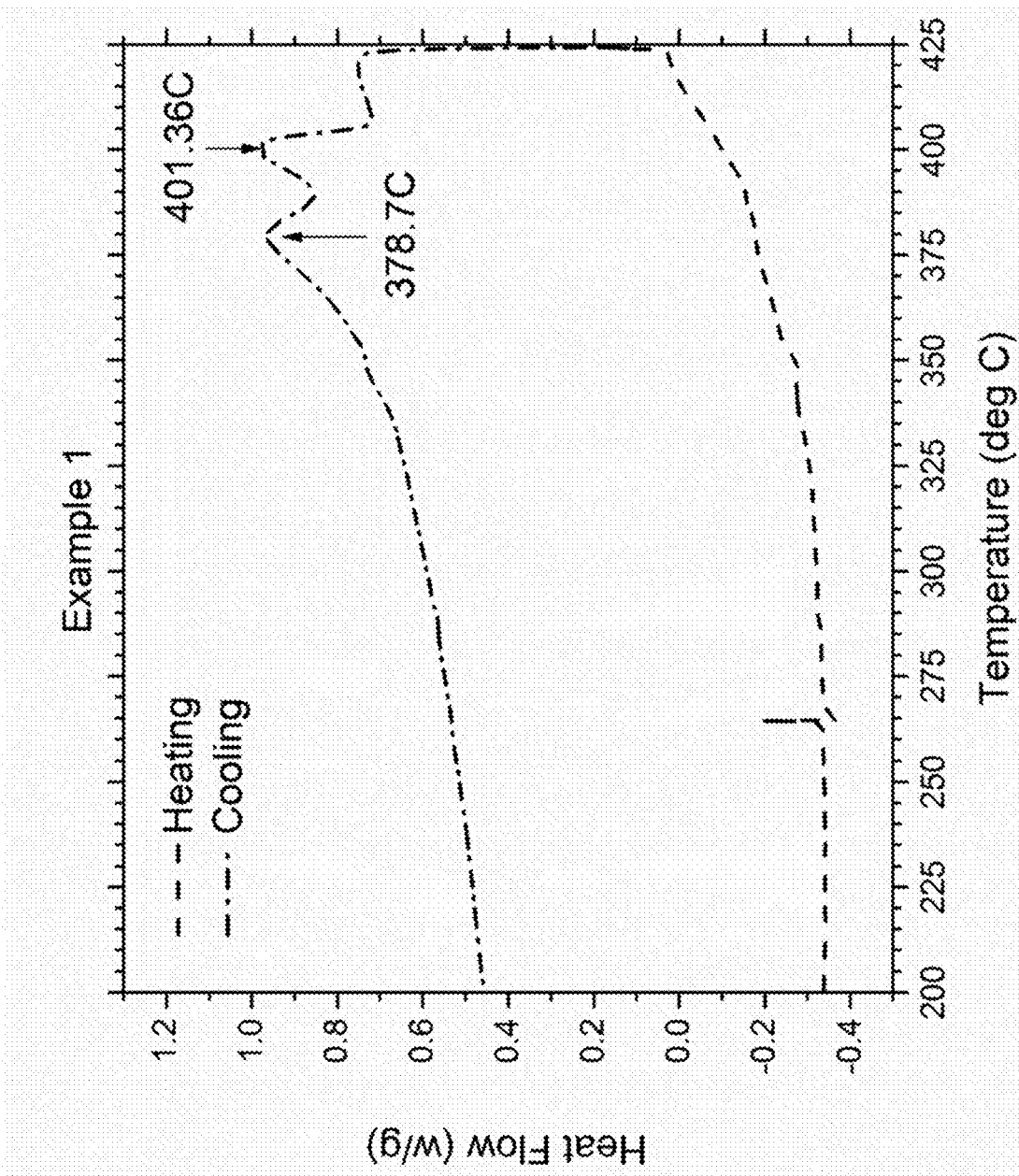
FIG. 13 is a differential scanning thermogram (DSC) of the expanded, porous PPX-AF4 membrane of Example 1 according to an embodiment of the invention.

Scanning electron micrographs (SEMs) of the surface and the cross section of the expanded porous PPX-AF4 membrane are shown in FIGS. 3 and 4, respectively. A wide angle x-ray diffraction (WAXD) pattern of the expanded porous PPX-AF4 membrane is shown in FIG. 6. A differential scanning thermogram (DSC) of the expanded, porous PPX-AF4 membrane is shown in FIG. 13. As shown in FIG. 13, the freestanding expanded, porous PPX-AF4 membrane, on cooling, exhibits two exothermic peaks, namely a first peak at 378.8° C. and the second peak at 401.36° C. The second peak is associated with the fibrils of the porous membrane. A Gurley number of the expanded PPX-AF4 membrane was determined to be 127.5 seconds and is reported in Table 1.

Example 2

A film of PPX-AF4 having a nominal thickness of 5 μm was deposited onto a blended, extruded, and dried polytetrafluoroethylene (PTFE) tape made generally in accordance with the teachings of U.S. Pat. No. 3,953,566 to Gore by a commercially available vapor deposition process (Specialty Coating Systems, 7645 Woodland Drive, Indianapolis, IN 46278).

The coated article was then cut to dimensions of 200 mm×200 mm and placed in the grips of a pantograph type biaxial batch expander equipped with a convection oven. The coated tape was heat soaked at a constant temperature of 300° C. for 300 seconds. The coated tape was then simultaneously stretched at an engineering strain rate (ESR) of 7 percent/second to an extension ratio in the extrudate machine direction of 4:1 and 4:1 in the extrudate transverse direction. The expanded PPX-AF4 article was removed from the oven, and allowed to cool to room temperature under restraint of the biaxial batch expander grips. After cooling the expanded PPX-AF4 article (i.e., co-expanded PTFE/PPX-AF4 membrane) was removed from the grips. A Gurley number of the expanded PPX-AF4 article was determined to be 68.38 and is reported in Table 1.

Example 3

A film of PPX-AF4 having a nominal thickness of 5 μm was deposited onto a blended, extruded, and dried polytetrafluoroethylene (PTFE) tape made generally in accordance with the teachings of U.S. Pat. No. 3,953,566 to Gore by a commercially available vapor deposition process (Specialty Coating Systems, 7645 Woodland Drive, Indianapolis, IN 46278). The coated article was then cut to dimensions of 200 mm×200 mm and placed in the grips of a pantograph type biaxial batch expander equipped with a convection oven. The coated tape was heat soaked at a constant temperature of 300° C. for 300 seconds. The coated tape was then simultaneously stretched at an engineering strain rate (ESR) of 70 percent/second to an extension ratio in the extrudate machine direction of 4:1 and 4:1 in the extrudate transverse direction. The expanded PPX-AF4 article was removed from the oven and allowed to cool to room temperature under restraint of the biaxial batch expander grips. After cooling, the expanded PPX-AF4 article (i.e., co-expanded PTFE/PPX-AF4 membrane) was removed from the grips.

Figure 7B:
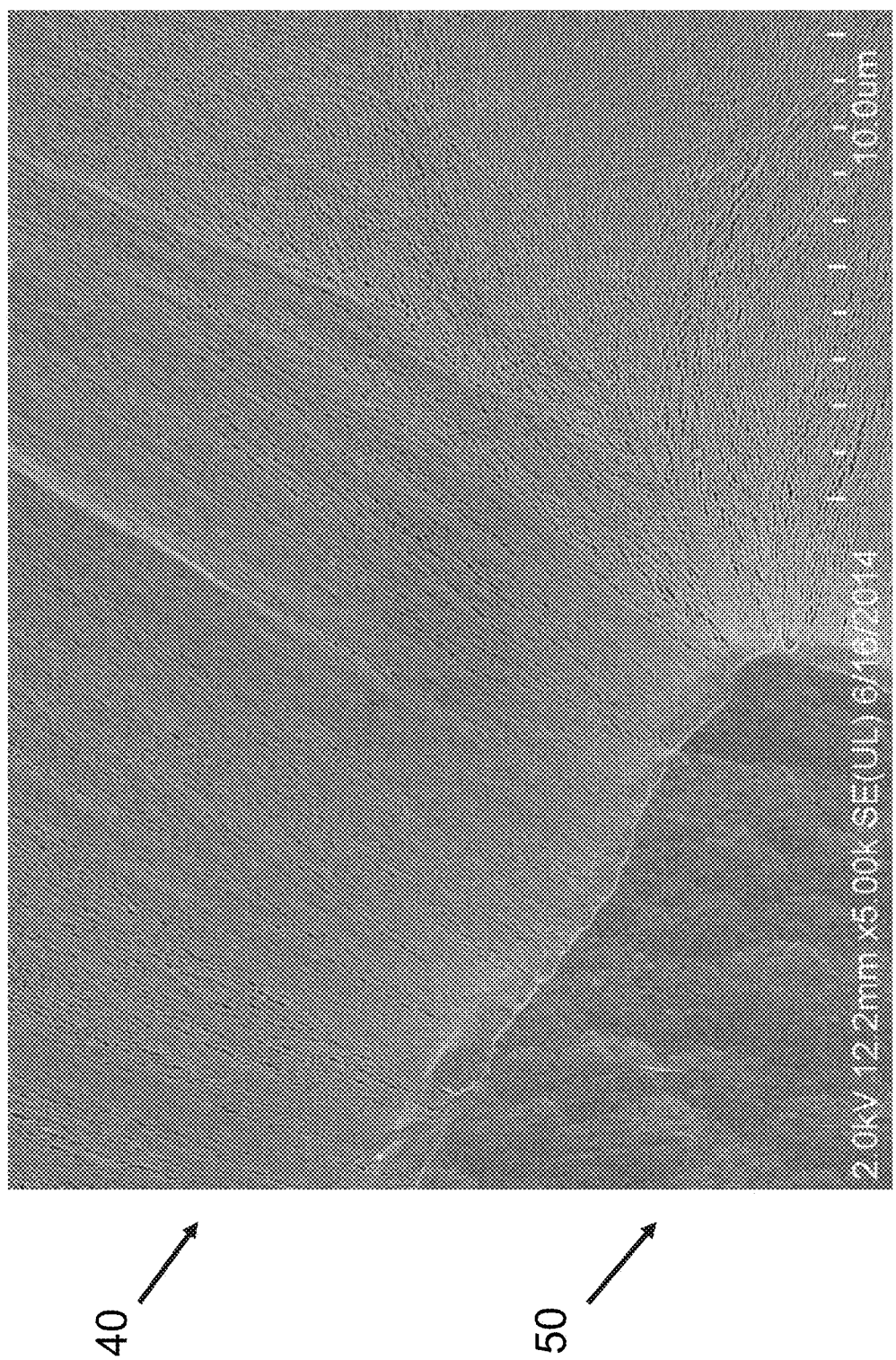
FIG. 7B is a scanning electron micrograph (SEM) of the surface of the expanded porous expanded porous polyparaxylylene-AF4 article of Example 3 taken at 5000× magnification according to at least one embodiment of the invention.
Figure 8:
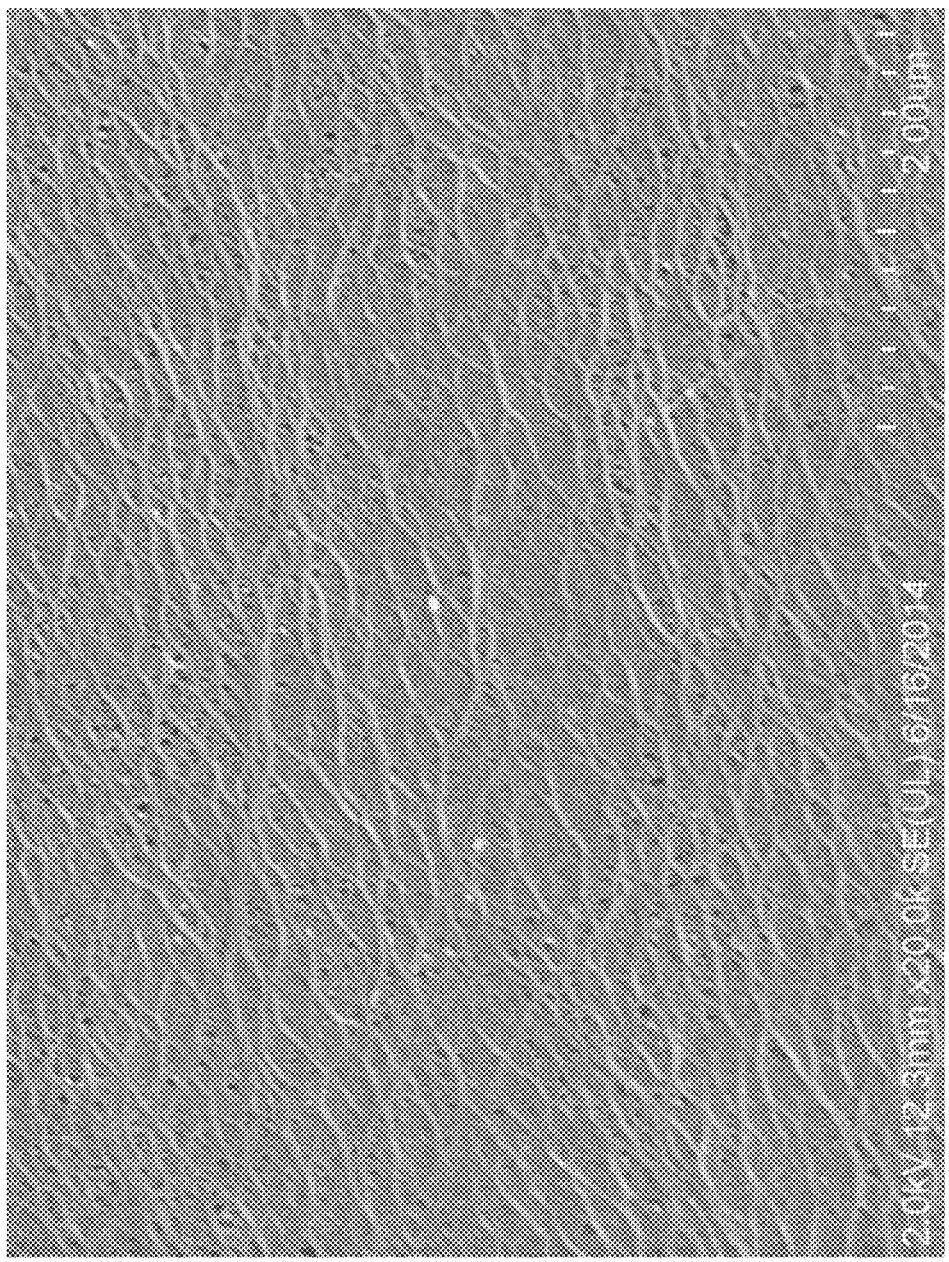
FIG. 8 is a scanning electron micrograph (SEM) of the surface of the expanded polyparaxylylene-AF4 article of Example 6 taken at 10,000× magnification in accordance with an embodiment of the invention.

A scanning electron micrograph (SEM) of the surface of the expanded PPX-AF4 membrane taken at 20,000× magnification is shown in FIG. 7A. A representative node is depicted by reference numeral 10 and a representative fibril is depicted by reference numeral 20. FIG. 7B is an SEM of the surface of the expanded PPX-AF4 membrane taken at 5000× magnification depicting therein an expanded region 40 and an unexpanded region 50. A Gurley number of the expanded PPX-AF4 article was determined to be 89.1 seconds and is reported in Table 1.

Example 4

A film of PPX-AF4 having a nominal thickness of 5 μm was deposited onto a blended, extruded, and dried polytetrafluoroethylene (PTFE) tape made generally in accordance with the teachings of U.S. Pat. No. 3,953,566 to Gore by a commercially available vapor deposition process (Specialty Coating Systems, 7645 Woodland Drive, Indianapolis, IN 46278).

The coated article was then cut to dimensions of 200 mm×200 mm and placed in the grips of a pantograph type biaxial batch expander equipped with a convection oven. The coated tape was heat soaked at a constant temperature of 300° C. for 300 seconds. The coated tape was then simultaneously stretched at an engineering strain rate (ESR) of 700 percent/second to an extension ratio in the extrudate machine direction of 4:1 and 4:1 in the tape transverse direction. The expanded PPX-AF4 article was removed from the oven and allowed to cool to room temperature under restraint of the biaxial batch expander grips. After cooling, the expanded PPX-AF4 article (i.e., co-expanded PTFE/PPX-AF4 membrane) was removed from the grips. A Gurley number of the expanded PPX-AF4 article was determined to be 111.7 seconds and is reported in Table 1.

Example 5

A film of PPX-AF4 having a nominal thickness of 5 μm was deposited onto a blended, extruded, and dried polytetrafluoroethylene (PTFE) tape made generally in accordance with the teachings of U.S. Pat. No. 3,953,566 to Gore by a commercially available vapor deposition process (Specialty Coating Systems, 7645 Woodland Drive, Indianapolis, IN 46278).

The coated article was then cut to dimensions of 200 mm×200 mm and placed in the grips of a pantograph type biaxial batch expander equipped with a convection oven. The coated tape was heat soaked at a constant temperature of 300° C. for 300 seconds. The coated tape was then simultaneously stretched at an engineering strain rate (ESR) of 7 percent/second to an extension ratio in the extrudate machine direction of 6:1 and 6:1 in the tape transverse direction. The expanded PPX-AF4 article was removed from the oven and allowed to cool to room temperature under restraint of the pantograph biaxial expander grips. After cooling, the expanded PPX-AF4 article (i.e., co-expanded PTFE/PPX-AF4 membrane) was removed from the expander grips. A Gurley number of the expanded PPX-AF4 article was determined to be 60.92 seconds and is reported in Table 1.

Example 6

A film of PPX-AF4 having a nominal thickness of 5 μm was deposited onto blended, extruded, and dried polytetrafluoroethylene (PTFE) tape made generally in accordance with the teachings of U.S. Pat. No. 3,953,566 to Gore by a commercially available vapor deposition process (Specialty Coating Systems, 7645 Woodland Drive, Indianapolis, IN 46278).

The coated article was then cut to dimensions of 200 mm×200 mm and placed in the grips of a pantograph type biaxial batch expander equipped with a convection oven. The coated tape was heat soaked at a constant temperature of 300° C. for 300 seconds. The coated tape was then simultaneously stretched at an engineering strain rate (ESR) of 70 percent/second to an extension ratio in the tape machine direction of 6:1 and 6:1 in the tape transverse direction. The expanded PPX-AF4 article was removed from the oven and allowed to cool to room temperature under restraint of the biaxial batch expander grips. After cooling, the expanded PPX-AF4 article (i.e., co-expanded PTFE/PPX-AF4 membrane) was, removed from the grips. A Gurley number of the expanded PPX-AF4 article was determined to be 54.36 seconds and is reported in Table 1.

Example 7

A film of PPX-AF4 having a nominal thickness of 5 μm was deposited onto a blended, extruded, and dried polytetrafluoroethylene (PTFE) tape made generally in accordance with the teachings of U.S. Pat. No. 3,953,566 to Gore by a commercially available vapor deposition process (Specialty Coating Systems, 7645 Woodland Drive, Indianapolis, IN 46278).

The coated article was then cut to dimensions of 200 mm×200 mm and placed in the grips of a pantograph type biaxial batch expander equipped with a convection oven. The coated tape was heat soaked at a constant temperature of 300° C. for 300 seconds. The coated tape was then simultaneously stretched at an engineering strain rate (ESR) of 700 percent/second to an extension ratio in the extrudate tape machine direction of 6:1 and 6:1 in the tape transverse direction. The expanded PPX-AF4 article was removed from the oven and allowed to cool to room temperature under restraint of the biaxial batch expander grips. After cooling, the expanded PPX-AF4 article (i.e., co-expanded PTFE/PPX-AF4 membrane) was removed from the grips. A Gurley number of the expanded PPX-AF4 article was determined to be 65.06 and is reported in Table 1.

Example 8

A film of PPX-AF4 having a nominal thickness of 5 μm was deposited onto blended, extruded, and dried polytetrafluoroethylene (PTFE) tape made generally in accordance with the teachings of U.S. Pat. No. 3,953,566 to Gore by a commercially available vapor deposition process (Specialty Coating Systems, 7645 Woodland Drive, Indianapolis, IN 46278).

The coated article was then cut to dimensions of 200 mm×200 mm and placed in the grips of a pantograph type biaxial batch expander equipped with a convection oven. The coated tape was heat soaked at a constant temperature of 250° C. for 300 seconds. The coated tape was then simultaneously stretched at an engineering strain rate (ESR) of 7 percent/second to an extension ratio in the tape machine direction of 4:1 and 4:1 in the tape transverse direction. The expanded PPX-AF4 article was removed from the oven and allowed to cool to room temperature under restraint of the biaxial batch expander grips. After cooling, the expanded PPX-AF4 article (i.e., co-expanded PTFE/PPX-AF4 membrane) was removed from the grips. A Gurley number of the expanded PPX-AF4 article was determined to be 109.0 seconds and is reported in Table 1.

Example 9

A film of PPX-AF4 having a nominal thickness of 5 μm was deposited onto a blended, extruded, and dried polytetrafluoroethylene (PTFE) tape made generally in accordance with the teachings of U.S. Pat. No. 3,953,566 to Gore by a commercially available vapor deposition process (Specialty Coating Systems, 7645 Woodland Drive, Indianapolis, IN 46278).

Figure 9:
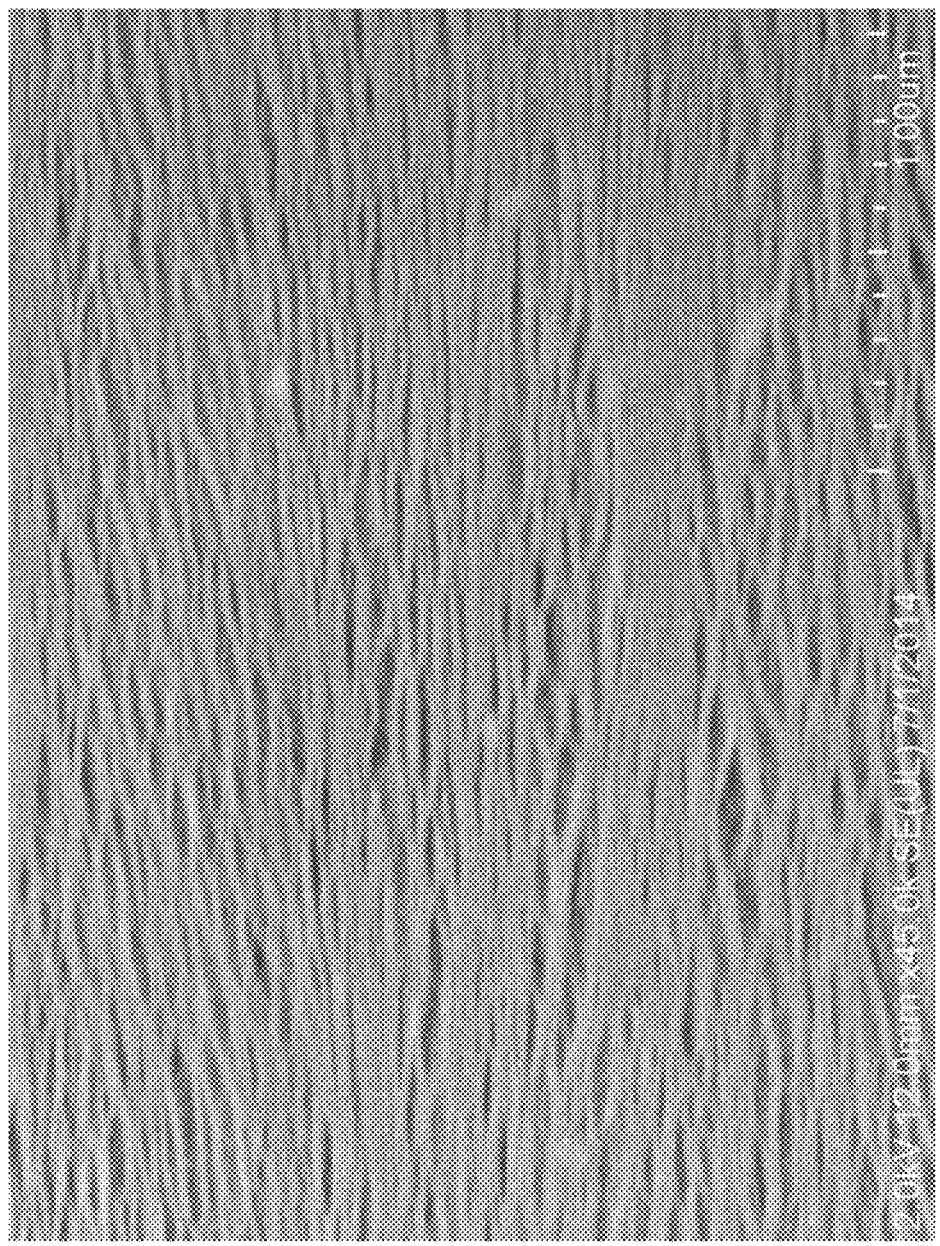
FIG. 9 is a scanning electron micrograph (SEM) of the surface of the expanded polyparaxylylene-AF4 article of Example 9 taken at 45,000× magnification according to at least one embodiment of the invention.

The coated article was then cut to dimensions of 200 mm×200 mm and placed in the grips of a pantograph type biaxial batch expander equipped with a convection oven. The coated tape was heat soaked at a constant temperature of 250° C. for 300 seconds. The coated tape was then simultaneously stretched at an engineering strain rate (ESR) of 70 percent/second to an extension ratio in the tape machine direction of 6:1 and 6:1 in the tape transverse direction. The expanded PPX-AF4 article was removed from the oven and allowed to cool to room temperature under restraint of the biaxial batch expander grips. After cooling, the expanded PPX-AF4 article (i.e., co-expanded PTFE/PPX-AF4 membrane) was removed from the grips. FIG. 9 is a scanning electron micrograph (SEM) of the surface of the expanded PPX-AF4 article of taken at 45,000× magnification showing a fibrillated region. A Gurley number of the expanded PPX-AF4 article was determined to be 103.26 seconds and is reported in Table 1.

Example 10

A film of PPX-AF4 having a nominal thickness of 5 μm was deposited onto a blended, extruded, and dried polytetrafluoroethylene (PTFE) tape made generally in accordance with the teachings of U.S. Pat. No. 3,953,566 to Gore by a commercially available vapor deposition process (Specialty Coating Systems, 7645 Woodland Drive, Indianapolis, IN 46278).

The coated article was then cut to dimensions of 200 mm×200 mm and placed in the grips of a pantograph type biaxial batch expander equipped with a convection oven. The coated tape was heat soaked at a constant temperature of 250° C. for 300 seconds. The coated, tape was then simultaneously stretched at an engineering strain rate (ESR) of 700 percent/second to an extension ratio in the tape machine direction of 6:1 and 6:1 in the tape transverse direction. The expanded PPX-AF4 article was removed from the oven and allowed to cool to room temperature under restraint of the biaxial batch expander grips. After cooling, the expanded PPX-AF4 article (i.e., co-expanded PTFE/PPX-AF4 membrane) was removed from the grips. A Gurley number of the expanded PPX-AF4 article was determined to be 119.3 seconds and is reported in Table 1.

TABLE 1

| Example | Description | Gurley (s) |
|---|---|---|
| Comp. Ex. 1 | Monolithic PPX AF4 Film | >3600 |
| Ex. 1 | Expanded PPX-AF4 membrane | 127.5 |
| Ex. 2 | Co-expanded PTFE/PPX-AF4 membrane | 68.38 |
| Ex. 3 | Co-expanded PTFE/PPX-AF4 membrane | 89.1 |
| Ex. 4 | Co-expanded PTFE/PPX-AF4 membrane | 111.7 |
| Ex. 5 | Co-expanded PTFE/PPX-AF4 membrane | 60.92 |
| Ex. 6 | Co-expanded PTFE/PPX-AF4 membrane | 54.36 |
| Ex. 7 | Co-expanded PTFE/PPX-AF4 membrane | 65.06 |
| Ex. 8 | Co-expanded PTFE/PPX-AF4 membrane | 109.0 |
| Ex. 9 | Co-expanded PTFE/PPX-AF4 membrane | 103.26 |
| Ex. 10 | Co-expanded PTFE/PPX-AF4 membrane | 119.3 |
| Ex 14 | Co-expanded PTFE/PPX-AF4 membrane | 407.7 |

Example 11

A film of PPX-N having a nominal thickness of 10 µm was deposited onto a blended, extruded, and dried polytetrafluoroethylene (PTFE) tape made generally in accordance with the teachings of U.S. Pat. No. 3,953,566 to Gore by a commercially available vapor deposition process (Specialty Coating Systems, 7645 Woodland Drive, Indianapolis, IN 46278).

Figure 10:
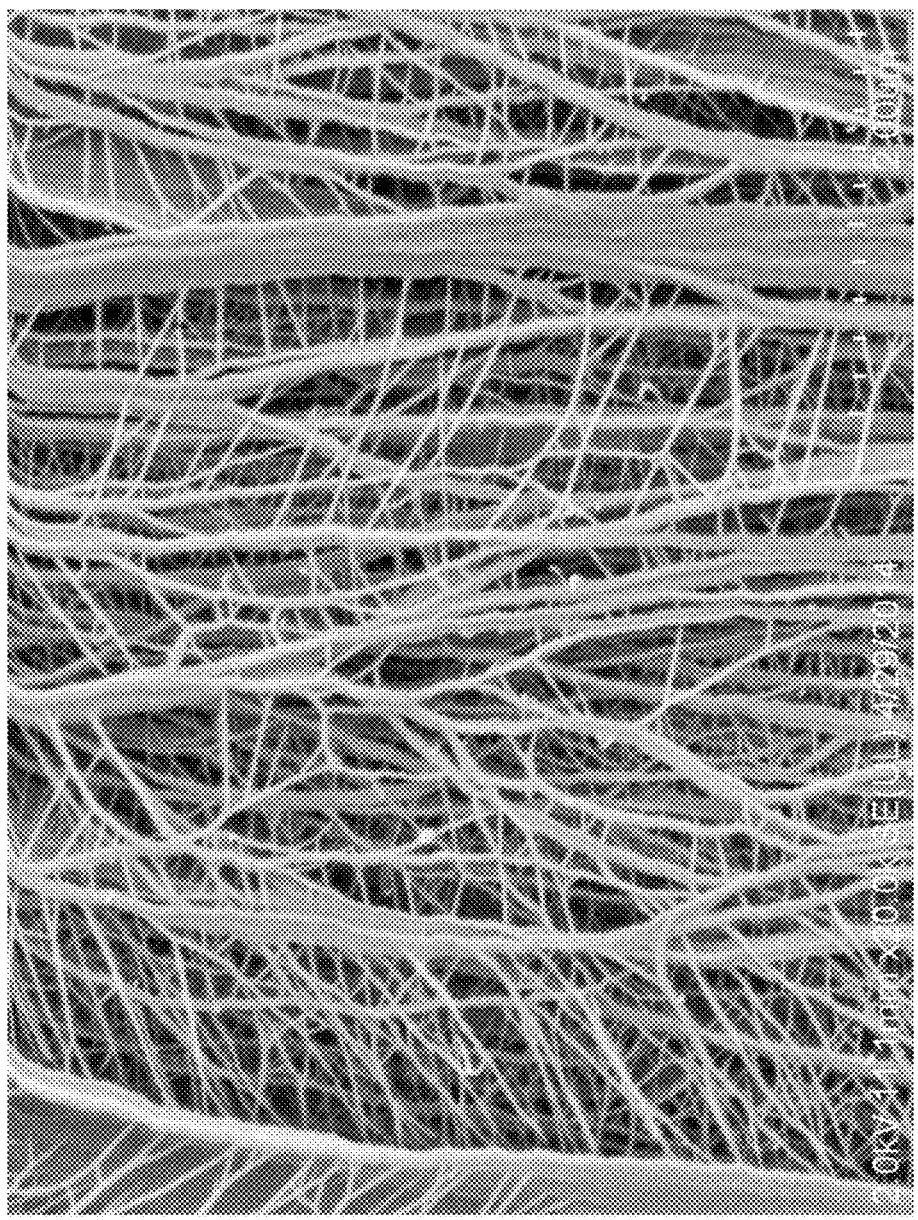
FIG. 10 is a scanning electron micrograph (SEM) of the surface of the PPX-N membrane of Example 11 drawn to an extension ratio of 2.2 at an engineering strain rate of 50 percent per second taken at 20,000× magnification in accordance with an embodiment of the invention.

The coated article was then cut into a 35 mm×13 mm rectangle with the samples long dimension aligned with the Example 1 tape machine direction (MD) direction. The rectangular sample was drawn to an extension ratio of 2.2 at an engineering strain rate (ESR) of 50 percent per second in a RSA 3 Dynamic Mechanical Analyzer (DMA), the gauge length was 10 mm, TA Instruments, Newcastle, DE using the standard TA film grips. The atmosphere in the DMA oven was a continuous purge of nitrogen gas. Oven temperature was set to 290° C. and the film sample was heat soaked for 300 seconds. A scanning electron micrograph (SEM) of the surface of the PPX-N membrane taken at 20,000× magnification is shown in FIG. 10.

Example 12

Figure 11:
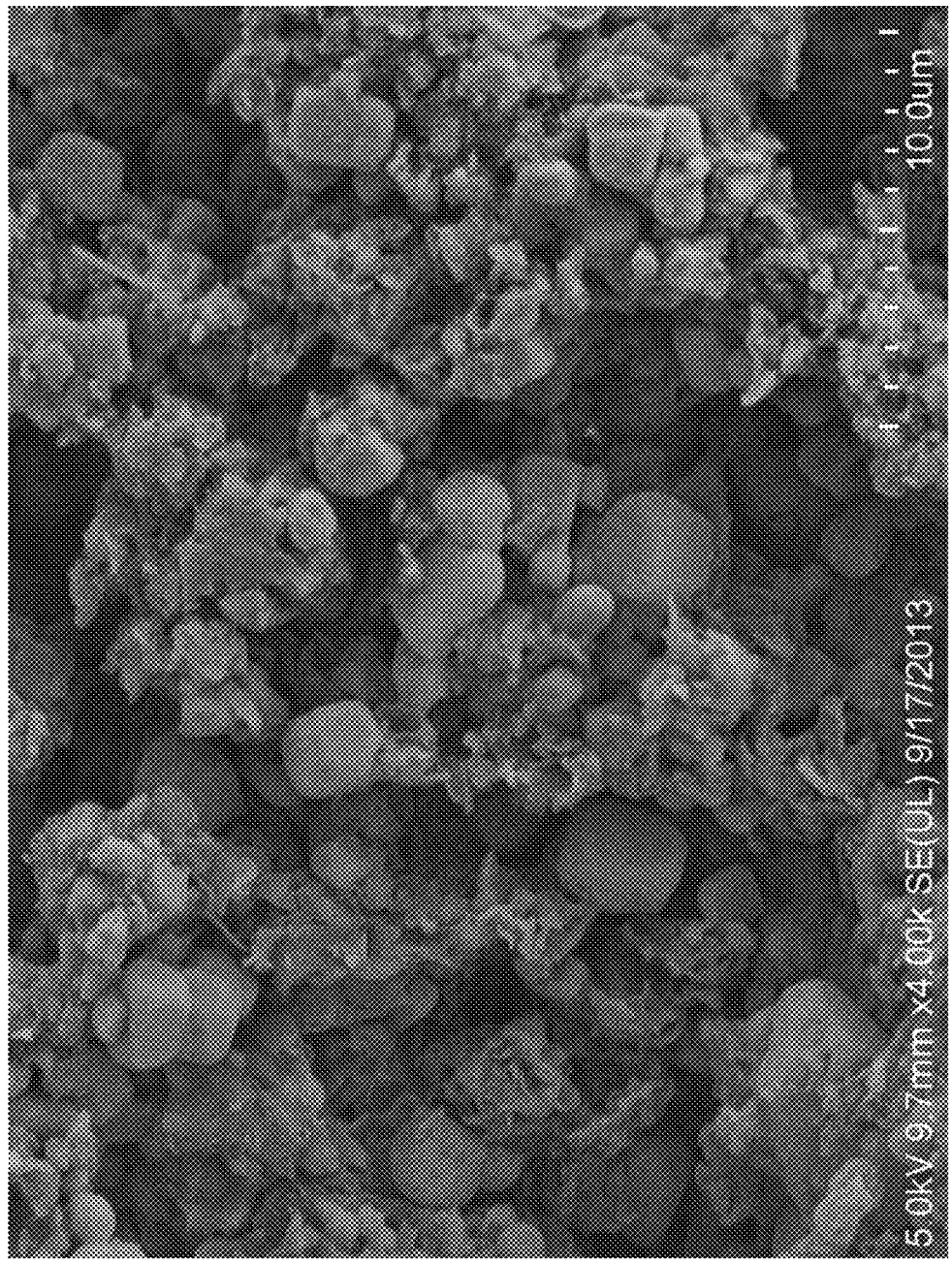
FIG. 11 is a scanning electron micrograph (SEM) of the PPX-N fine powder of Example 12 taken at 4,000× magnification according to at least one embodiment of the invention.

Approximately 1000 grams of anhydrous p-xylene was charged into 2 liter round bottom flask with a magnetic stirrer at room temperature. Approximately 16 grams of potassium t-butoxide was added to the reaction flask. The flask was heated to 90° C. When all of the potassium t-butoxide was dissolved, 15 grams of alpha-chloro p-xylene was added the flask. The mixture immediately turned yellow. The reaction mixture was then heated to reflux at approximately 135° C. After 30 minutes, 5.7 grams of the alpha chloro p-xylene dissolved in approximately 87 grams of p-xylene was added dropwise to the reaction mixture over 40 minutes. The reaction mixture was allowed to stir for approximately 16 hours. The solution was a cloudy suspension. The solution was cooled and then vacuum filtered to remove the xylene. The resulting product was dispersed into 2 liters of a 50/50 IPA/water mixture and filtered again. This was done two times. The dried product was then mixed into an IPA/water mixture, boiled, and filtered 2 more times. The product was allowed to dry in a hood overnight. Final drying was done at 120° C. for 4 hours in a vacuum oven. The final product was a PPX-N powder. FIG. 11 is a scanning electron micrograph (SEM) of the PPX-N powder taken at 4,000× magnification.

Example 13

The PPX-N powder of Example 12 was lubricated with mineral oil and calendered at 150° C. to form a thin PPX-N sheet about 0.5 mm thick.

Example 14

A film of PPX-AF4 having a nominal thickness of 10 µm was deposited onto a blended, extruded, and dried polytetrafluoroethylene (PTFE) tape made generally in accordance with the teachings of U.S. Pat. No. 3,953,566 to Gore by a commercially available vapor deposition process (Specialty Coating Systems, 7645 Woodland Drive, Indianapolis, IN 46278).

Figure 14:
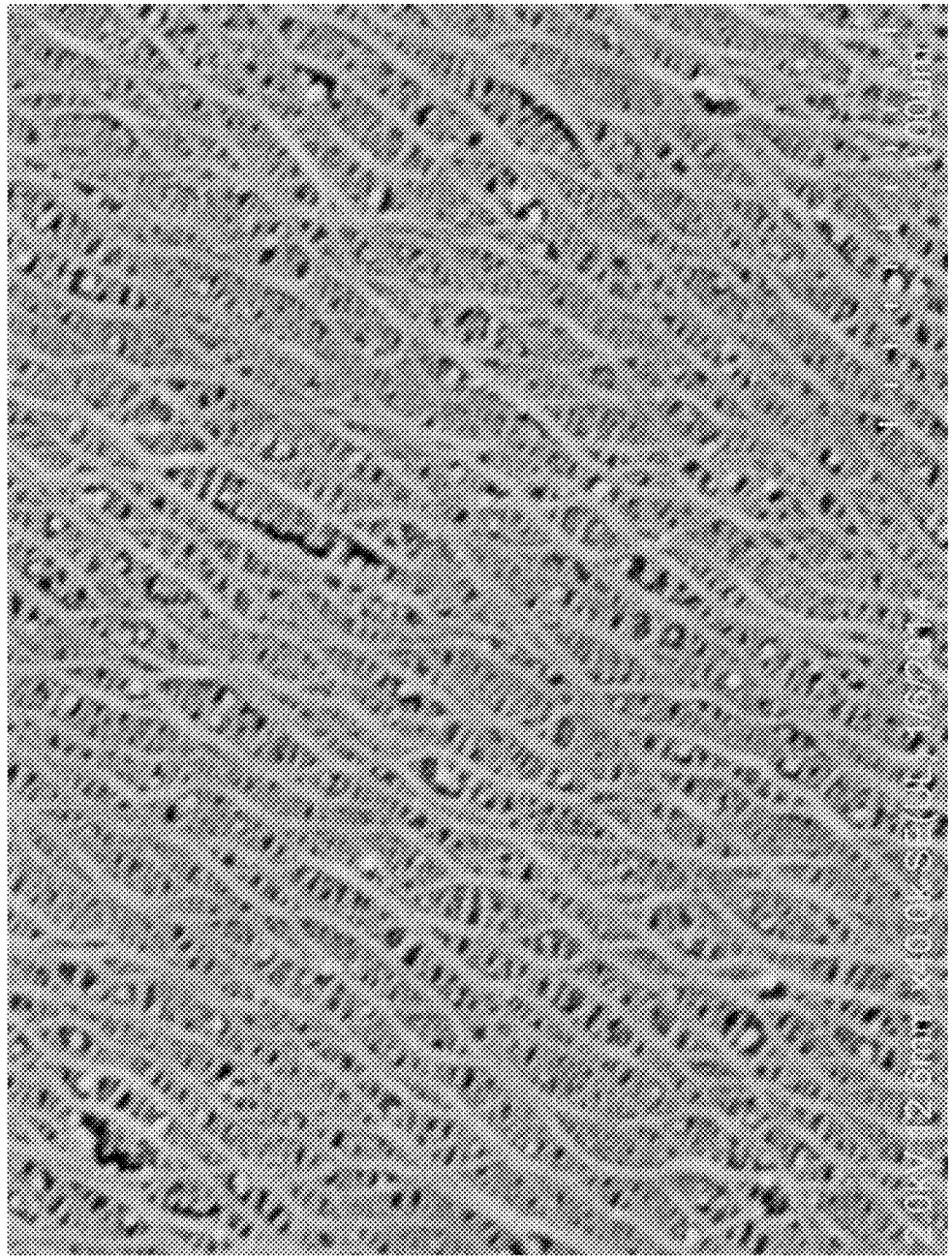
FIG. 14 is a scanning electron micrograph (SEM) of the surface of the co-expanded PTFE/PPX-AF4 membrane of Example 14 taken at 40,000× magnification according to at least one embodiment of the invention.
Figure 15:
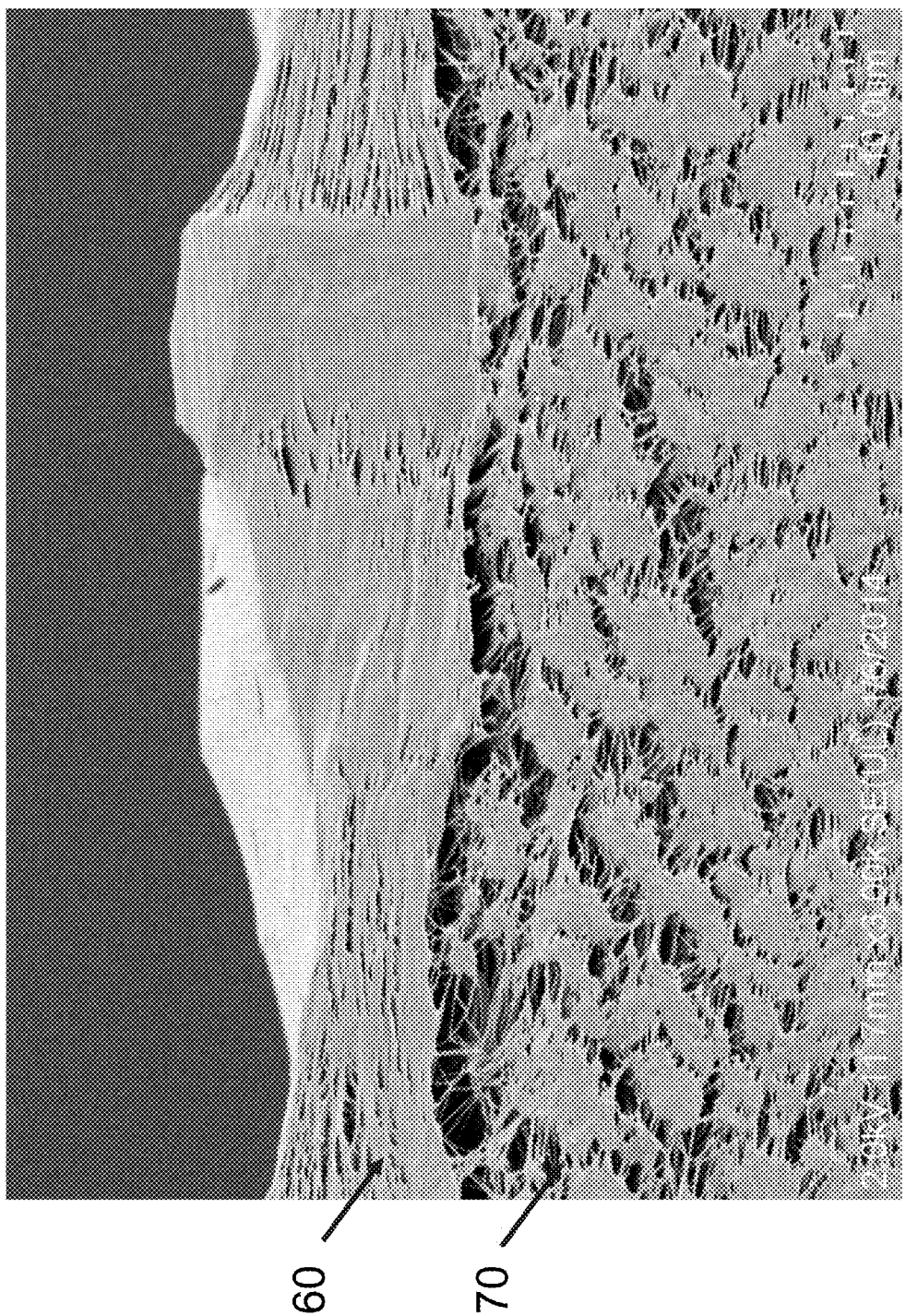
FIG. 15 is a scanning electron micrograph (SEM) of the cross-section of the co-expanded PTFE/PPX-AF4 membrane of Example 14 taken at 3000× magnification in accordance with one embodiment of the invention.

The coated article was then cut to dimensions of 200 mm×200 mm and placed in the grips of a pantograph type biaxial batch expander equipped with a convection oven. The coated article was heat soaked at a constant temperature of 300° C. for 300 seconds. The coated article was then simultaneously stretched at an engineering strain rate (ESR) of 100 percent/second to an extension ratio of 2:1 in both the extrudate machine and transverse directions. The expanded PPX-AF4 article was removed from the oven, and allowed to cool to room temperature under restraint of the biaxial batch expander grips. After cooling, the co-expanded PTFE/PPX-AF4 membrane was removed from the grips. A scanning electron micrograph (SEM) of a surface of the above co-expanded PTFE/PPX-AF4 membrane taken at 40,000× magnification is shown in FIG. 14. FIG. 15 shows a scanning electron micrograph (SEM) of the cross-section of the above co-expanded PTFE/PPX-AF4 membrane taken at 3000× magnification. FIG. 15 illustrates a first tight microstructure (60) and a second open microstructure (70) of the above composite structure. Gurley number of the expanded PPX-AF4 article was determined to be 407.7 seconds.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A porous polyparaxylylene (PPX) article comprising a biaxially expanded PPX polymer membrane having a microstructure of nodes interconnected by fibrils,
   wherein said fibrils comprise polymer chains and said polymer chains are oriented along a fibril axis,
   wherein said PPX article has a percent porosity of at least 10%, and
   wherein the porous polyparaxylylene article is a freestanding biaxially expanded PPX polymer membrane.

2. The porous polyparaxylylene article of claim 1, wherein said biaxially expanded PPX polymer membrane comprises a polyparaxylylene polymer is selected from the group consisting of PPX-N, PPX-AF4, PPX-VT4 and combinations thereof.

3. The porous polyparaxylylene article of claim 1, wherein said polyparaxylylene polymer includes from 0.001 mol % to 10 mol % of a comonomer.

4. The porous polyparaxylylene article of claim 1, wherein said PPX article has a thickness less than 50 microns.

5. The porous polyparaxylylene article of claim 1, wherein said PPX article is in the form of a sheet, tape, or tube.

6. The porous polyparaxylylene (PPX) polymer article of claim 1 wherein said PPX article has a percent porosity of at least 20%.

* * * * *